(12) United States Patent
Wilen (10) Patent No.: US 8,922,853 B2
(45) Date of Patent: Dec. 30, 2014

(54) PRINTER CALIBRATION SYSTEM AND ASSOCIATED METHODS

(71) Applicant: WILopEN Products LC, Deerfield Beach, FL (US)

(72) Inventor: Richard Wilen, Boca Raton, FL (US)

(73) Assignee: WILopEN Products LC, Deerfield Beach, FL (US)

( * ) Notice: Subject to any disclaimer, the term of this patent is extended or adjusted under 35 U.S.C. 154(b) by 34 days.

(21) Appl. No.: 13/838,933

(22) Filed: Mar. 15, 2013

(65) Prior Publication Data

US 2013/0278967 A1  Oct. 24, 2013

Related U.S. Application Data

(63) Continuation-in-part of application No. 12/464,740, filed on May 12, 2009, now Pat. No. 8,577,735, and a continuation-in-part of application No. 12/777,810, filed on May 11, 2010, and a continuation-in-part of application No. 12/846,834, filed on Jul. 30, 2010, and a continuation-in-part of application No. 12/873,031, filed on Aug. 31, 2010, and a continuation-in-part of application No. 12/846,835, filed on Jul. 30, 2010.

(60) Provisional application No. 61/052,377, filed on May 12, 2008.

(51) Int. Cl.
*H04N 1/46* (2006.01)
*G06K 15/00* (2006.01)
*G06K 15/02* (2006.01)
*H04N 1/00* (2006.01)

(52) U.S. Cl.
CPC .......... *G06K 15/027* (2013.01); *H04N 1/00045* (2013.01); *H04N 1/00015* (2013.01); *H04N 1/00031* (2013.01); *H04N 1/00053* (2013.01); *H04N 1/00063* (2013.01); *H04N 1/00087* (2013.01); *H04N 1/0009* (2013.01); *H04N 2201/0098* (2013.01); *H04N 2201/0082* (2013.01)
USPC .......................................... 358/504; 358/1.16

(58) Field of Classification Search
None
See application file for complete search history.

(56) References Cited

U.S. PATENT DOCUMENTS

| | | | |
|---|---|---|---|
| 5,041,866 A * | 8/1991 | Imoto | 355/38 |
| 5,276,459 A * | 1/1994 | Danzuka et al. | 346/33 A |
| 5,490,243 A | 2/1996 | Millman | |
| 5,594,557 A | 1/1997 | Rolleston | |
| 5,796,414 A | 8/1998 | Sievert | |
| 5,825,996 A | 10/1998 | Davis | |
| 5,995,714 A | 11/1999 | Hadley | |
| 6,097,498 A | 8/2000 | Debry | |
| 6,215,562 B1 | 4/2001 | Michel | |
| 7,006,246 B1 * | 2/2006 | Nakajima | 358/1.9 |
| 7,070,100 B2 | 7/2006 | Davie | |
| 7,142,319 B2 | 11/2006 | Ashey | |

(Continued)

*Primary Examiner* — Madelein A Nguyen
(74) *Attorney, Agent, or Firm* — Johnson & Martin, PA; James David Johnson (57) ABSTRACT

A dynamically applicable system to calibrate a number of printers having a controller including a processor and memory to control printing a document relative to characteristics of the document using the printer. Calibration settings for the printer may be manipulable. Calibration may be performed by comparing a calibration pattern to a marking on a calibration document. Additionally, calibration may be performed by comparing a calibration pattern with a crease. The controller may calculate calibration settings from calibration information received using an interface. Calibration settings are storable on memory or a database. The system may communicate with other devices over a network.

21 Claims, 7 Drawing Sheets

(56) References Cited

U.S. PATENT DOCUMENTS

| | | | |
|---|---|---|---|
| 7,284,061 B2 | 10/2007 | Matsubayashi | |
| 7,492,476 B1* | 2/2009 | Dodge et al. | 358/1.18 |
| 7,499,193 B2* | 3/2009 | Nishikawa | 358/1.9 |
| 7,719,716 B2 | 5/2010 | Klassen | |
| 8,537,380 B2* | 9/2013 | Yamada | 358/1.14 |
| 2003/0174886 A1* | 9/2003 | Iguchi et al. | 382/167 |
| 2004/0179217 A1* | 9/2004 | Chapman et al. | 358/1.12 |
| 2004/0218199 A1 | 11/2004 | Regimbal | |
| 2005/0105401 A1* | 5/2005 | Akahane et al. | 368/187 |
| 2005/0134918 A1 | 6/2005 | Reed | |
| 2005/0254864 A1* | 11/2005 | Koide | 399/299 |
| 2006/0054608 A1* | 3/2006 | Cahill et al. | 219/121.83 |
| 2006/0072128 A1* | 4/2006 | Ng et al. | 358/1.9 |
| 2006/0193017 A1* | 8/2006 | Zuber | 358/504 |
| 2006/0248476 A1 | 11/2006 | Yamada | |
| 2007/0024662 A1* | 2/2007 | Arazaki | 347/19 |
| 2007/0070424 A1* | 3/2007 | Chiwata | 358/3.03 |
| 2007/0081721 A1* | 4/2007 | Xiao et al. | 382/167 |
| 2007/0139672 A1 | 6/2007 | Klassen | |
| 2007/0188784 A1* | 8/2007 | Nishioka | 358/1.9 |
| 2007/0230976 A1* | 10/2007 | Takahashi | 399/35 |
| 2007/0247680 A1* | 10/2007 | Nakane et al. | 358/521 |
| 2009/0136251 A1* | 5/2009 | Fukushi | 399/74 |
| 2009/0231644 A1* | 9/2009 | Fukuhara | 358/518 |
| 2010/0074638 A1* | 3/2010 | Murayama | 399/31 |
| 2010/0110459 A1* | 5/2010 | Yamada | 358/1.9 |
| 2010/0134813 A1* | 6/2010 | Yamazaki | 358/1.9 |
| 2011/0043838 A1* | 2/2011 | Yamada et al. | 358/1.9 |
| 2011/0211853 A1* | 9/2011 | Yamada et al. | 399/49 |
| 2011/0317175 A1* | 12/2011 | Murayama et al. | 358/1.2 |
| 2012/0327214 A1* | 12/2012 | McEntyre | 348/86 |

* cited by examiner

PRINTER CALIBRATION SYSTEM AND ASSOCIATED METHODS

RELATED APPLICATION INFORMATION

This application claims the benefit of U.S. Nonprovisional patent application Ser. No. 12/464,740 filed May 12, 2009, Ser. No. 12/777,810 filed May 11, 2010, Ser. No. 12/846,834 filed Jul. 30, 2010, Ser. No. 12/873,031 filed Aug. 31, 2010, and Ser. No. 12/846,835 filed Jul. 30, 2010, and U.S. Provisional Application Ser. No. 61/052,377 filed May 12, 2008. The entire contents of the above mentioned patent application documents are hereby incorporated by reference as if fully set forth herein.

FIELD OF THE INVENTION

The invention relates to printers. More particularly, the invention relates to calibration of printers using a dynamically manipulable interface.

BACKGROUND

Almost all printers have small amounts of memory used for storing, communicating and setting-up the printer. Typical desktop printer settings and functions that need to be controlled include size of page being printed, type of document being printed (page, envelope, label, etc.), coloring of the document, print quality, orientation, and numerous other considerations. Additionally, printers are typically designed to use different methods to feed the sheets of documents into a printer, and may vary in their application of applying ink or toner to create a printed document.

Due to the large number of differences between printers, printer manufacturers often bundle proprietary software to configure the printer with a particular toner, ink cartridge, document feeding mechanism, or a multitude of other printer specific characteristics. This proprietary soft may be difficult to locate, whether stored across a network (such as the internet) or locally stored on physical media. Additionally, such propriety software typically must be installed on each system from which the printer may be used, generally requiring interaction from users of varying technical levels. Also, even after using the calibration techniques of the prior art cannot guarantee that the paper or form will move through the printer evenly and/or be precisely calibrated to print margins or form-fill areas without additional fine tuning or calibration. This inability to correctly center printing on a document may result in improperly located codes, which may be desirably located in a designated area of the document. The inability to correctly center printing may also lead to poorly calibrated and unfavorable color printing.

What is needed is a simplified system and method for calibrating a printer to recognize a document type and print a document. Also needed is a system and method to easily calibrate the center document location and allow for easier pre-formatted form printing.

SUMMARY

The printer calibration system and methods of the present invention provides a simplified system and method for calibrating a printer to recognize a document type and print a document. The printer calibration system and method additionally provides simplified calibration of the center document location and allows for easier pre-formatted form printing.

According to embodiments of the present invention, a system to calibrate a printer is described herein. In one aspect, the system may include a controller, which may include a processor and memory to control printing a document relative to characteristics of the document using the printer. Calibration settings for the printer are manipulable. The system may also include an interface to access and interact with the calibration module to calibrate the printer.

The printer may be calibrated by prompting a user to place a marking on a calibration document. Device information may be acquired about the printer including orientation of a feeder. The device information and document characteristics may be analyzed to determine a calibration pattern. The calibration pattern may be printed to the calibration document. The system may then acquire calibration information about the printed calibration pattern including locating the marking relative to the calibration pattern. The system may also analyze the calibration information to determine the calibration settings. The calibration settings may be stored in memory. In one aspect, calibration may include determining a center point of the document.

According to one aspect, the calibration module may be additionally used to calibrate the controller by prompting the user to fold the calibration document creating a crease. Calibration information may be acquired relative to the calibration pattern and the crease. The calibration information may be analyzed to further determine the calibration settings. The fold may include a vertical fold and a horizontal fold.

In one aspect, the system may further include a network adapter to connect the system to a network. A database may be accessible over the network. Calibration settings may be storable on the database. Configuration settings may be downloadable from the database over the network.

In another aspect, the printer may be associable with a plurality of controllers. The configuration settings for the printer may be downloadable to each of the plurality of controllers from the database.

In one aspect, an interface may be accessible over the network. The interface may include pages to at least provide instructions, prompt the user to perform an action, and/or acquire the information.

A method of calibrating a printer using a controller with a processor and memory with a manipulable interface is also provided. The method may include prompting a user to place a marking on a calibration document, acquiring device information about the printer including orientation of a feeder, and analyzing the device information and document characteristics to determine a calibration pattern. The method may also include printing the calibration pattern to the calibration document, acquiring calibration information about the printed calibration pattern including locating the marking relative to the calibration pattern, analyzing the calibration information to determine calibration settings for the printer, and storing the calibration settings to the memory. Calibrating the printer may include determining a center point of the document.

In one aspect, the method may further including prompting the user to fold the calibration document creating a crease, acquiring details about the calibration pattern relative to the crease, and analyzing the details to further determine calibration settings for the printer. The fold may include a vertical fold and a horizontal fold.

In one aspect, the method may be performed on a system that includes a network adapter to connect the system to a network. In this aspect, the method may include accessing a database over the network, and storing or retrieving calibration settings locatable on the database. The printer may be associable with a plurality of controllers, and wherein the configuration settings for the printer are downloadable to each of the plurality of controllers from the database.

In one aspect, the method may include accessing the interface over the network. The interface may include pages to at least provide instructions, prompt the user to perform an action, and/or acquire information.

Unless otherwise defined, all technical terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents and other references mentioned herein are incorporated by reference in their entirety. In the case of conflict, the present specification, including definitions will control.

DETAILED DESCRIPTION

The present invention is best understood by reference to the detailed drawings and description set forth herein. Embodiments of the invention are discussed below with reference to the drawings; however, those skilled in the art will readily appreciate that the detailed description given herein with respect to these figures is for explanatory purposes as the invention extends beyond these limited embodiments. For example, in light of the teachings of the present invention, those skilled in the art will recognize a multiplicity of alternate and suitable approaches, depending upon the needs of the particular application, to implement the functionality of any given detail described herein beyond the particular implementation choices in the following embodiments described and shown. That is, numerous modifications and variations of the invention may exist that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The present invention should not be limited to the particular methodology, compounds, materials, manufacturing techniques, uses, and applications, described herein, as these may vary. The terminology used herein is used for the purpose of describing particular embodiments only, and is not intended to limit the scope of the present invention. As used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" may be a reference to one or more steps or means and may include sub-steps and subservient means.

All conjunctions used herein are to be understood in the most inclusive sense possible. Thus, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. Structures described herein are to be understood also to refer to functional equivalents of such structures. Language that may be construed to express approximation should be so understood unless the context clearly dictates otherwise.

Unless otherwise defined, all terms (including technical and scientific terms) are to be given their ordinary and customary meaning to a person of ordinary skill in the art, and are not to be limited to a special or customized meaning unless expressly so defined herein.

Terms and phrases used in this application, and variations thereof, especially in the appended claims, unless otherwise expressly stated, should be construed as open ended as opposed to limiting. As examples of the foregoing, the term "including" should be read to mean "including, without limitation," "including but not limited to," or the like; the term "having" should be interpreted as "having at least"; the term "includes" should be interpreted as "includes but is not limited to"; the term "example" is used to provide exemplary instances of the item in discussion, not an exhaustive or limiting list thereof; and use of terms like "preferably," "preferred," "desired," "desirable," or "exemplary" and words of similar meaning should not be understood as implying that certain features are critical, essential, or even important to the structure or function of the invention, but instead as merely intended to highlight alternative or additional features that may or may not be utilized in a particular embodiment of the invention.

Those skilled in the art will also understand that if a specific number of an introduced claim recitation is intended, such an intent will be explicitly recited in the claim, and in the absence of such recitation no such intent is present. For example, as an aid to understanding, the appended claims may contain usage of the introductory phrases "at least one" and "one or more" to introduce claim recitations; however, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C" is used, in general, such a construction is intended in the sense one having skill in the art would understand the convention (e.g., "a system 10 having at least one of A, B, and C" would include but not be limited to system 10s that have A alone, B alone, C alone, A and B together, A and C together, B and C together, and/or A, B, and C together, etc.). In those instances where a convention analogous to "at least one of A, B, or C" is used, in general such a construction is intended in the sense one having skill in the art would understand the convention (e.g., "a system 10 having at least one of A, B, or C" would include but not be limited to system 10s that have A alone, B alone, C alone, A and B together, A and C together, B and C together, and/or A, B, and C together, etc.).

All numbers expressing dimensions, quantities of ingredients, reaction conditions, and so forth used in the specification are to be understood as being modified in all instances by the term "about" unless expressly stated otherwise. Accordingly, unless indicated to the contrary, the numerical parameters set forth herein are approximations that may vary depending upon the desired properties sought to be obtained.

The present invention will now be described in detail with reference to embodiments thereof as illustrated in the accompanying drawings. In the following description, a system for calibrating a printer will be discussed. Those of skill in the art will appreciate alternative labeling of the system, calibration system, calibrator, the invention, or other similar names. Skilled readers should not view the inclusion of any alternative labels as limiting in any way.

A printer calibration system will now be discussed generally. At its most basic level, the printer calibration system may be an electronic device communicatively connected to a printer that may alter the location of ink or toner to create a printed document. For the purposes of this disclosure, a document is defined to include the paper or material on which a printing may be made. A document may include a sheet of paper, label, envelope, printable fabric, heavy stock paper, cardboard, printable card, plastic, or other printable objects that would be apparent to a skilled artisan after having the benefit of this disclosure. A calibration document will be discussed, which may include a calibration pattern used to calibrate a printer. Additionally, a printed document may be discussed, which may be a product that results from a printing operation performed by a printer.

For the purposes of this disclosure, a printer will be discussed. A printer is defined to include devices capable of making a marking on document with an at least partially automated process. Examples of printers included in this definition include, but should not be limited to, inkjet, laser, dot matrix, daisy-wheel, and other printer types.

Figure 1:
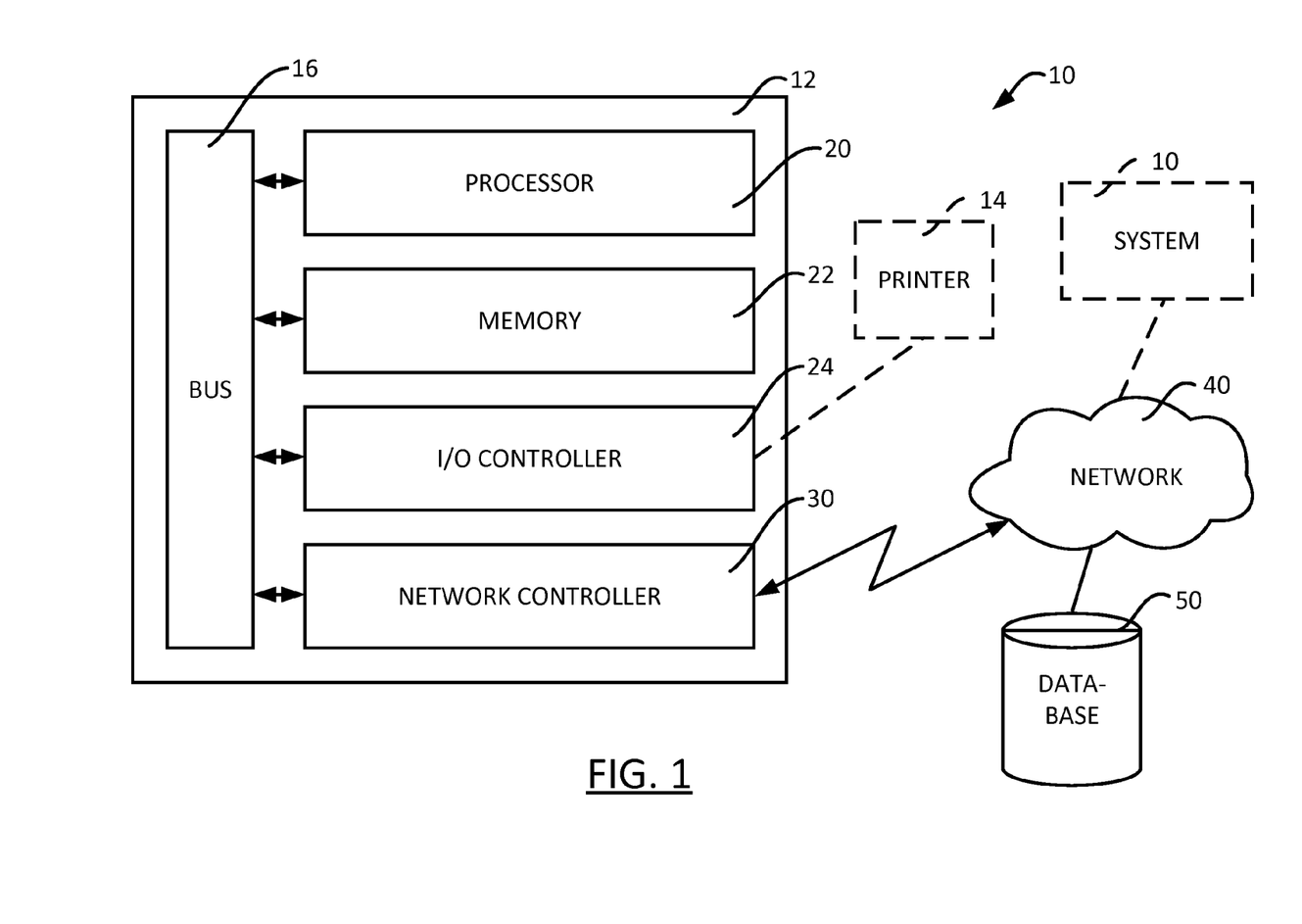
FIG. 1 is a block diagram of the system including a controller, according to an embodiment of the present invention.
Figure 2:
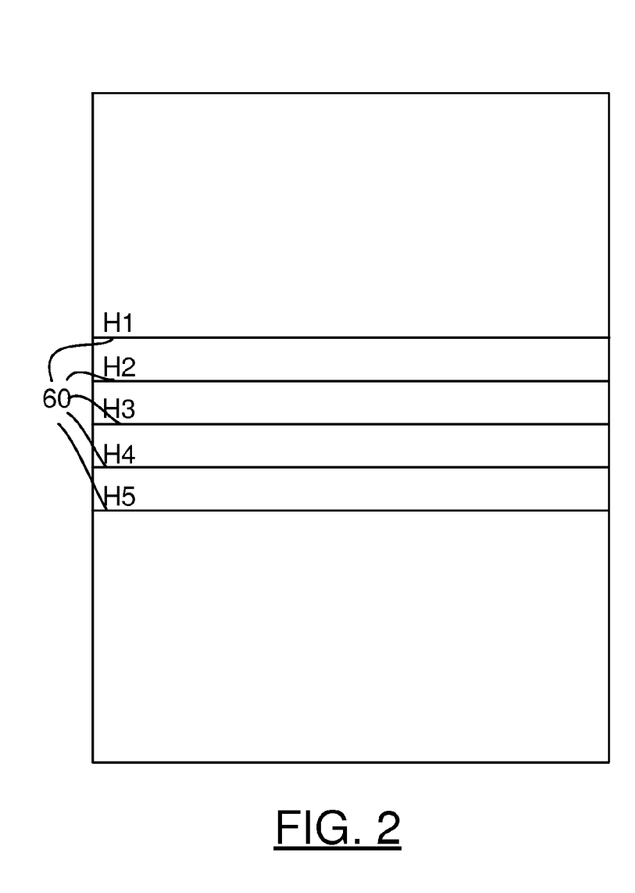
FIGS. 2-5 are illustrations of a configuration document, according to various embodiments of the present invention.

Referring now to FIG. 1, an example of a controller 12 that can be used to calibrate the printer 14 will now be discussed. The controller 12 may be included, or provided at least partially by, a computing device such as a desktop computer, notebook computer, server, dedicated logic device, FPGA, or other digital device that would be apparent to a skilled artisan. The system 10 illustrated in FIG. 1 may also be included in a printer 14 or be communicatively connected to a printer 14 to be calibrated. The system 10 may be connected to the printer 14, for example, using an I/O interface 24, which may include being physically connected or communicatively connected via a network 40.

The controller 12 may include a processor 20, memory 22, an input/output (I/O) interface 24, and optionally a network adapter 30. The processor 20 may capable of performing electronic calculations using digital logic. The processor 20 may receive data signals from other components of the system 10 using a bus 16. Alternatively, the processor 20 may be directly connected to one or more of the other components of the system 10 such that data may be transferred between the components. The processor 20 may receive data as electronic signals from the other components. The data may be processed by the processor 20 to produce results, control an operation, or create new data.

The controller 12 may also include memory 22. The memory 22 may include volatile and/or non-volatile memory modules. Volatile memory modules may include random access memory (RAM), which may temporarily store data and code being accessed by the processor 20. Non-volatile memory may include flash based memory, data sectors located on rotating platters, or other memory platforms that may retain data with or without a constant supply of electrical power. Non-volatile memory may be used to store computerized program information, which may be provided to the processor 20 for processing or calculation. Information that may be included in the memory 22 may relate to printer details, user profiles, calibration settings, or other information that may be considered during use of an embodiment of the system 10. For the purpose of this disclosure, device information may be discussed relating to details about the printer or printing device. Additionally, calibration information may be discussed relating to the calibration settings determined through the operation of the system 10, according to an embodiment of the present invention.

The memory 22 may also include computerized code to be used by the processor 20 to control operation of a printer 14. The memory 22 may also store feedback information related to the operation of additional components used in printing, printer calibration, and related computing tasks. In an embodiment of the present invention, the memory 22 may include an operating system. An operating system may additionally include applications that may be run from within the operating system, as will be appreciated by a person of skill in the art. Data, which may relate to calibration and settings, may be recorded in a database 50. The database 50 may be stored in the memory 22 of the system 10. Alternatively, the database 50 may be stored remotely across a network 40, which will be discussed in greater detail below. Skilled artisans will appreciate that multiple databases 50 may be included or in communication with system 10, which may be connected locally, through a network 40, or via a combination of local and networked connections.

The controller may also include an input/output interface 24 (I/O interface). The I/O interface 24 may control the receipt and transmission of data between the system 10 and other devices. In an example, a printer 14 may be connected to the system 10 via the I/O interface 24. Data and electronic signals may be communicated using the I/O interface 24 in multiple directions, such as transmit and receive directions.

A network adapter 30 may be included in the system 10. In an embodiment of the present invention, the network adapter 30 may be included within the controller 12 of the system 10. In another embodiment, the network adapter 30 may be connected to the system 10 outside of the controller, for example, via the I/O interface 24. The network adapter 30 may be connected to a network 40, such as a home or corporate network, a virtual private network, or the internet.

The network adapter 30 may provide a channel for the electronic communication of data between the system 10 and a connected database 50. Provided without the intent to be limiting, examples of network connected devices may include personal computers, tablets, smartphones, personal data assistants, or other electronic devices capable of connecting to a network 40.

The network adapter 30 may connect to a network 40 via a proprietary or standard connection protocol. With respect to embodiments of the present invention that include a proprietary network connection, the network adapter 30 may perform handshake operations and exchange data with network connected devices, as may be defined within the proprietary protocol. Alternately, the network adapter 30 may connect to a network 40 via a standardized protocol. Examples of standardized protocols, provided without the intent to be limiting, may include 802.3 Ethernet, 802.11 Wi-Fi, 802.15.1 Bluetooth, 802.15.4 low rate personal area network 40 (PAN) environments, packet switching wide area networks (WAN), cellular relay WANs, or additional standardized data transmission protocols.

The user may interact with the system 10, and more specifically with the controller 12, by using an interface. The interface may be presented to the user using a display, which may be connected to the controller 12, for example, via the I/O interface 24. The interface may also be accessible by a user via a network 40, for example, using a web browser connected to the internet.

The interface may include one or more pages. The interface may provide information to users, such as prompts and/or instructions to follow for calibrating a printer. Pages of the interface may also present questions to a user and gather answers. Through the pages of the interface, a user may additionally create a profile, browse information included in a database 50, communicate with other users or support technicians, purchase gifts, print codes related to purchased gifts, shop, conduct commerce, or perform virtually any other transaction. The interface may also provide interaction with a user in other ways that would be apparent to a person of skill in the art, after having the benefit of this disclosure.

Printers that may be include or be connected the system 10 will now be discussed. Although documents may be fed to a printer in a variety of ways, the print area printers are fed documents through a top tray or bottom drawer. The print area should be understood to the space inside a printer that results in ink or toner being received by a document to produce a printed document. For example, the print area may the space underneath the inkjet print heads or the corona wire of a laser. The print area may include the position where the ink or toner applies or ink droplets or toner pixels onto the document crating a printed document. According to another aspect of the present invention, the print area may not be a static area. As an example, the print area may track a document as it may move through the printer.

The print area of a printer may receive a document from a top feeder. Using a top feeder, a stack of blank documents may be placed into a feed mechanism. The top feeder may rely on gravity to drop document, such as a blank piece of paper, over a mechanically controlled lip. The lip may deliver a controlled number of sheets to the printer area, typically feeding a single document to the print area at a time. The document may then enter pinch rollers. The pinch rollers generally include two rubber rollers with gears or belts and a motor and/or servo. The pinch rollers may operate in the opposite direction at the same speed to push the document through the print area. Skilled artisans will appreciate the above discussion of the mechanical top feeding process to illustrate a single embodiment of providing vertical movement of a document through a top fed printer, and is not intended to limit the ways in which a document may be fed to a printer.

A number of paper guides may be included to control the horizontal (left to right) alignment of top feed printers. Guides may be located in a fixed position, or may be adjustable. An adjustable guide is usually flexible, meaning it may be moved from left to right based on the type of document being fed into the printer. Usually, markings are included to preset the left hand paper guide based on common form sizes, for example 8½"×11" paper or a No. 10 envelope.

Printers may also include bottom document feeders. Using a bottom paper feeder, a stack of blank documents may be placed flat into a tray. Trays generally have mechanical spring loaded guides in both vertical and horizontal directions. The guides are usually spring loaded with pre-sets to handle different sizes of common documents, such as 8½"×11", 8½×14" and No. 10 envelopes.

The feed mechanism for a bottom document feeder generally includes one or more roller powered by gears or belts and a motor and/or servo. For example, a first roller may start feeding the top document sheet in the tray into pinch rollers, similar to the top fed printer. Next, the document may be directed around another roller/radius to orient an area on which ink or toner may be applied. As the document continues moving through the printer, it may as another set of pinch rollers to be delivered to the top of the printer, or a similar paper delivery mechanism to receive printed documents.

Due to the number of components included in a printer, and the large number of ways the components may be configured and implemented, printers often require calibration to ensure printed features are properly located on the document. Using one or more calibration technique of this disclosure, a large variety of printers may be calibrated using a simplified procedure. The calibration documents, along with the operations illustrated in the flow charts to follow below, illustrate various of the present invention to provide simplified and consistent calibration of a printer.

Referring now to FIGS. 2-5, examples of calibration documents will now be discussed. The calibration documents illustrated in FIGS. 2-5 are provided as in the interest of clarity, and are not intended to be an exhaustive representation of the plethora of orientations by which a calibration document may configured. Starting with FIG. 2, a calibration document is illustrated with a number of horizontal calibration lines 60 (in this example, $H_1$-$H_5$). The horizontal calibration lines 60 may cross the calibration document from side to side, or across a narrow width of the document. Calibration of the printer may be performed by following instructions provided by the system 10 and noting the location of the calibration line ($H_1$-$H_5$) with respect to the instructions. In an example with instructions to fold the calibration document, a user may be instructed by the system 10 to determine the lateral calibration line ($H_1$-$H_5$) nearest to a crease created by folding. This example will be discussed in greater detail below.

Figure 3:
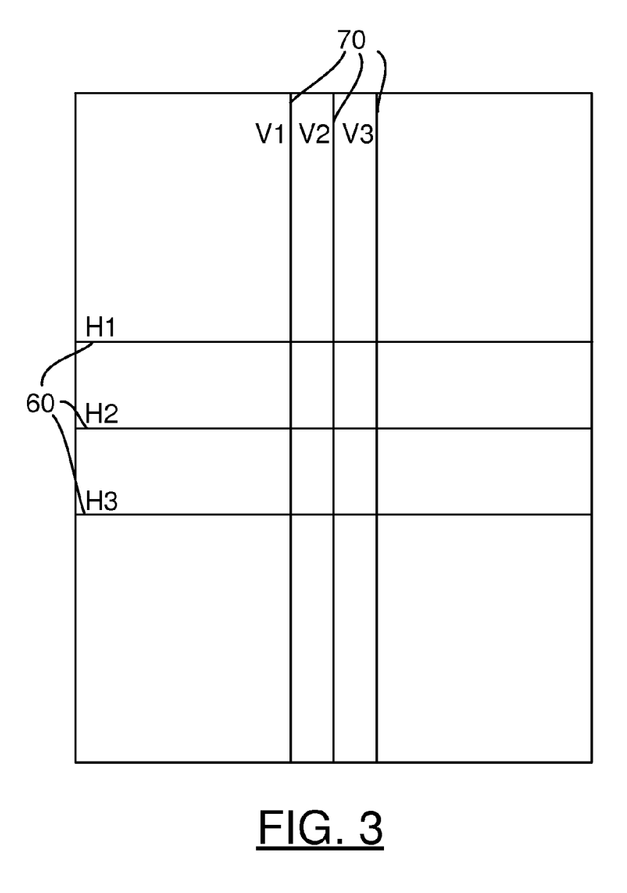

Referring now to FIG. 3, a calibration document is illustrated with a number of horizontal calibration lines 60 (in this example, $H_1$-$H_3$) and vertical calibration lines 70 (in this example, $V_1$-$V_3$). The horizontal calibration lines 60 may cross the calibration document from side to side, or across a narrow width of the document. The vertical calibration lines 70 may cross the calibration document from top to bottom, or across a wide width of the document. Calibration of the printer may be performed by following instructions provided by the system 10 and noting the location of the calibration line 60, 70 with respect to the instructions. The location of calibration lines 60, 70 with respect to the calibration document may be recorded as calibration information. In an example with instructions to folds of the calibration document a number of times, a user may be instructed by the system 10 to determine the horizontal calibration line 60 and vertical calibration line 70 nearest respective creases created by folding. An example of this operation will also be discussed in greater detail below.

Figure 4:
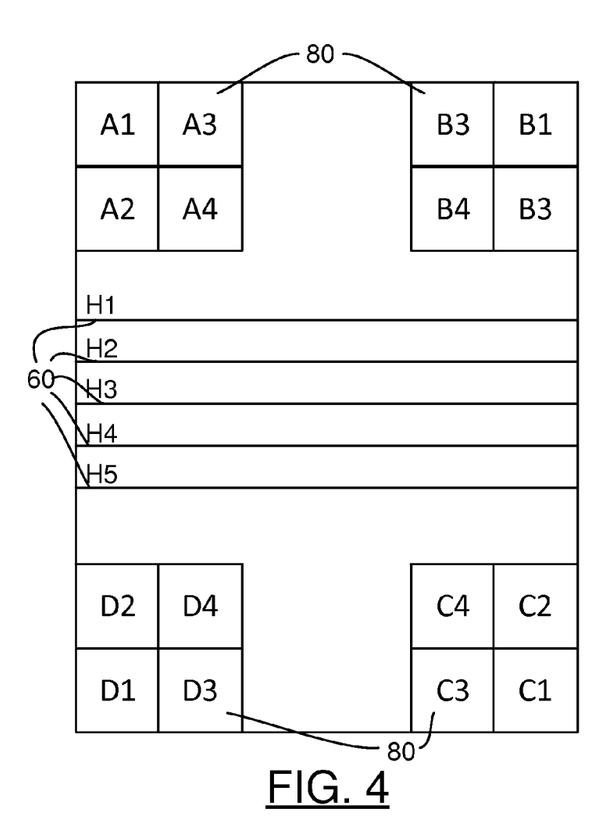

Referring now to FIG. 4, a calibration document is illustrated with a number of calibration spaces 80 (A-D). These calibration spaces may be used to orient the direction a document is received and printed by the printer. As illustrated, the calibration spaces may be separated into subspaces. As an example, FIG. 4 illustrates the calibration space A as separated into four calibration subspaces $A_1$-$A_4$. Although the calibration spaces, and corresponding subspaces, are illustrated with approximately the same dimensions, a person of skill in the art will appreciate that calibration spaces and/or subspaces of varying sizes may also be included within the scope and spirit of the present invention. The calibration spaces may also be used to calibrate the printer by following instructions provided by the system 10 and noting the location of a marking with respect to the instructions. In an example with instructions to place a marking, such as an "X," in a corner, a user may be instructed by the system 10 to determine the calibration space or subspace nearest to the marking. This example will also be discussed in greater detail below. The embodiment illustrated in FIG. 4 may optionally include calibration lines, such as, for example, horizontal calibration lines 60.

Figure 5:
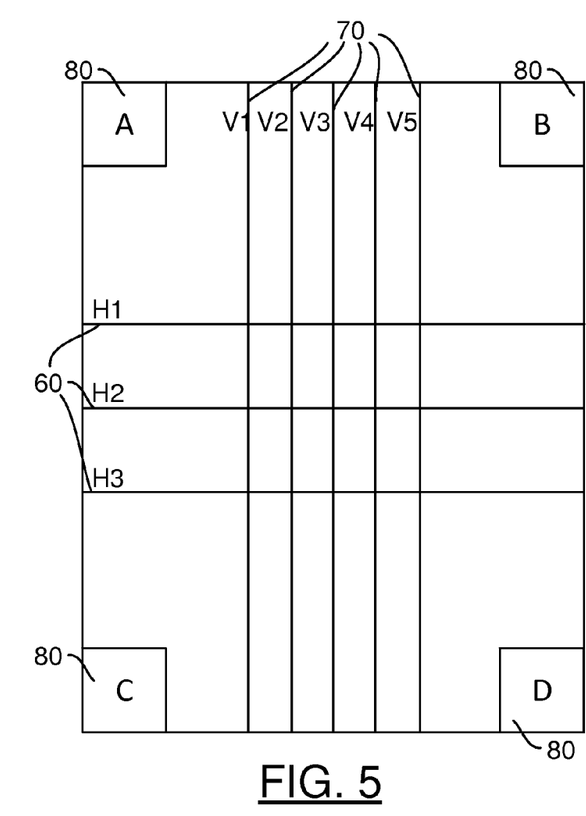

FIG. 5 illustrates a calibration document including the horizontal calibration lines 60 and vertical calibration lines 70 similar to FIG. 3, along with the calibration spaces 80 similar to FIG. 4. Skilled artisans will appreciate that additional horizontal and/or vertical calibration lines 60, 70 may be included in the calibration document. Additionally, skilled artisans will appreciate that the calibration spaces 80 may be of virtually any dimensions includable on the calibration document, and may be divided into any number of calibration subspaces. Use of calibration lines 60, 70 and spaces 80 have been discussed above, along with FIGS. 2-4, and will further be discussed in below.

In operation, the system 10 of the present invention may be used to calibrate one or more types of printers using computing devices of similarly differing composition. The following methods and procedures for operating the system 10 illustrated below are provided in the interest in clarity. Although the flowcharts included in FIGS. 6-9 illustrate embodiments and techniques to calibrate a printer using the system 10, skilled artisans should not view the present invention to such embodiments.

The illustrative operation included below contemplates the calibration of a printer along with an interactive gifting system 10 and method, as described in Nonprovisional Utility patent application Ser. No. 12/464,740 'Interactive Gifting System 10 and Method' dated May 12, 2009. The printer may be calibrated to print on multi-purpose forms, as described in application Ser. No. 12/777,810 'Multi-Purpose Forms' dated May 11, 2010 and CIP application Ser. No. 12/846,834 'Multi-Component Forms dated Jul. 30, 2010. The printer may also be calibrated to print on a multi-pack gift card, for example, using a multi-pack gift card system 10, such as described in application Ser. No. 12/873,031 'Multi-Pack Gift card System 10 and Methods dated Aug. 31, 2010. Form based artwork may be used in the printing, which may be utilize the calibration system 10 of the present invention, which has been described in Nonprovisional application Ser. No. 12/846,835 'Form-Based Artwork Kits dated Jul. 30, 2010. All of the applications disclosed in the paragraph are hereby incorporated by references, and this disclosure is intended to include the entire disclosures thereof.

As part of the systems, methods and combination of gift card, greeting card and envelope product formats being developed in consort with ShopWILopEN.com and/or GiftE.com, forms and documents may require the users to be provided an easy way to calibrate a printer, for example to define a center point of a document. The embodiments of the present invention allow print data to be printed relative to the center of the document. The illustrative operations included below are provided as examples of how the system 10 may compensate with the greatly variable feed and margin mechanisms among various makes and models of printers.

Figure 6:
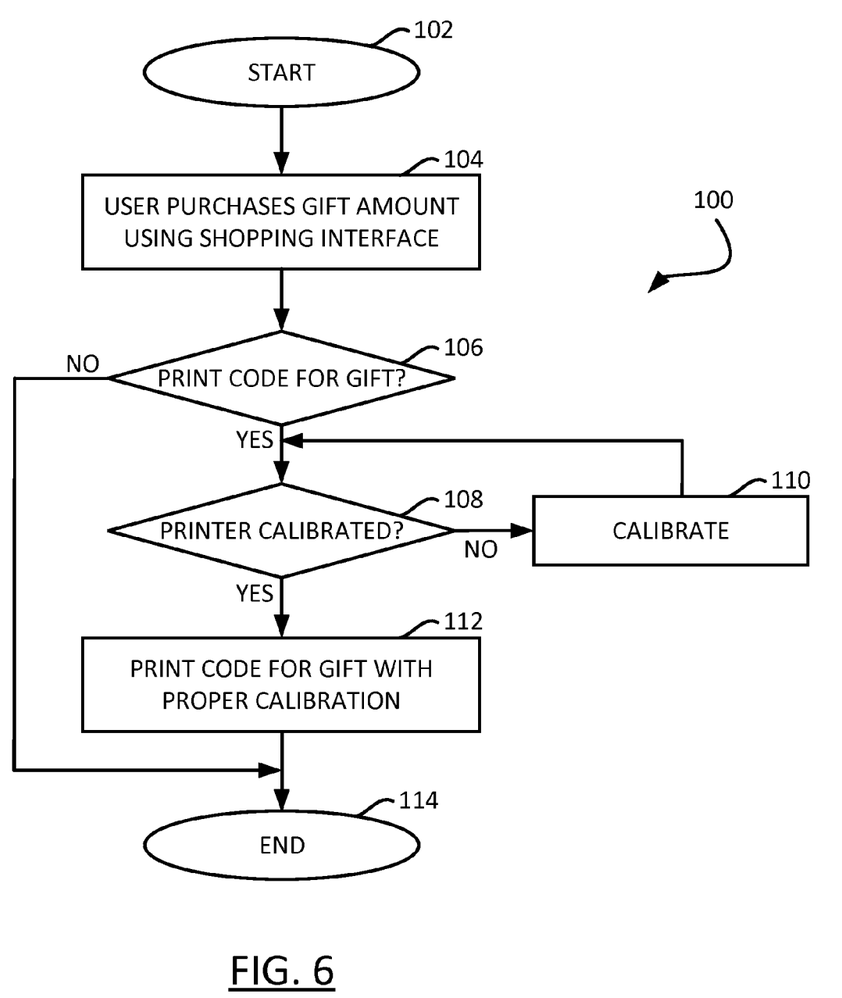
FIG. 6 is a flow chart illustrating a method to print a code relating to a gift in a calibrated location on a document, according to an embodiment of the present invention.

Referring now to flowchart 100 of FIG. 6, an illustrative calibration operation will now be described generally. Starting at Block 102, the user may use a shopping interface, such as ShopWILopEN.com and/or GiftE.com, to purchase a gift amount (Block 104). The system may then determine whether a code for the gift should be printed on a document (Block 106). This determination may be performed automatically by the system, or request the interaction of a user. If it is determined at Block 106 that no code should be printed, the operation may terminate at Block 114. If it is determined at Block 106 that the system should print the code, the system may then determine whether the printer has be calibrated (Block 108). If it is determined that the system has not been calibrated at Block 108, the system may calibrate the printer (Block 110), after which it will again determine whether the printer has been properly calibrated at Block 108. The steps involved with calibration will discussed in greater detail below. If it is determined at Block 108 that the printer has been properly calibrated, the operation may continue to Block 112, wherein it may instruct the printer to print the code for the gift with the proper calibration. The operation may then terminate at Block 114.

Figure 7:
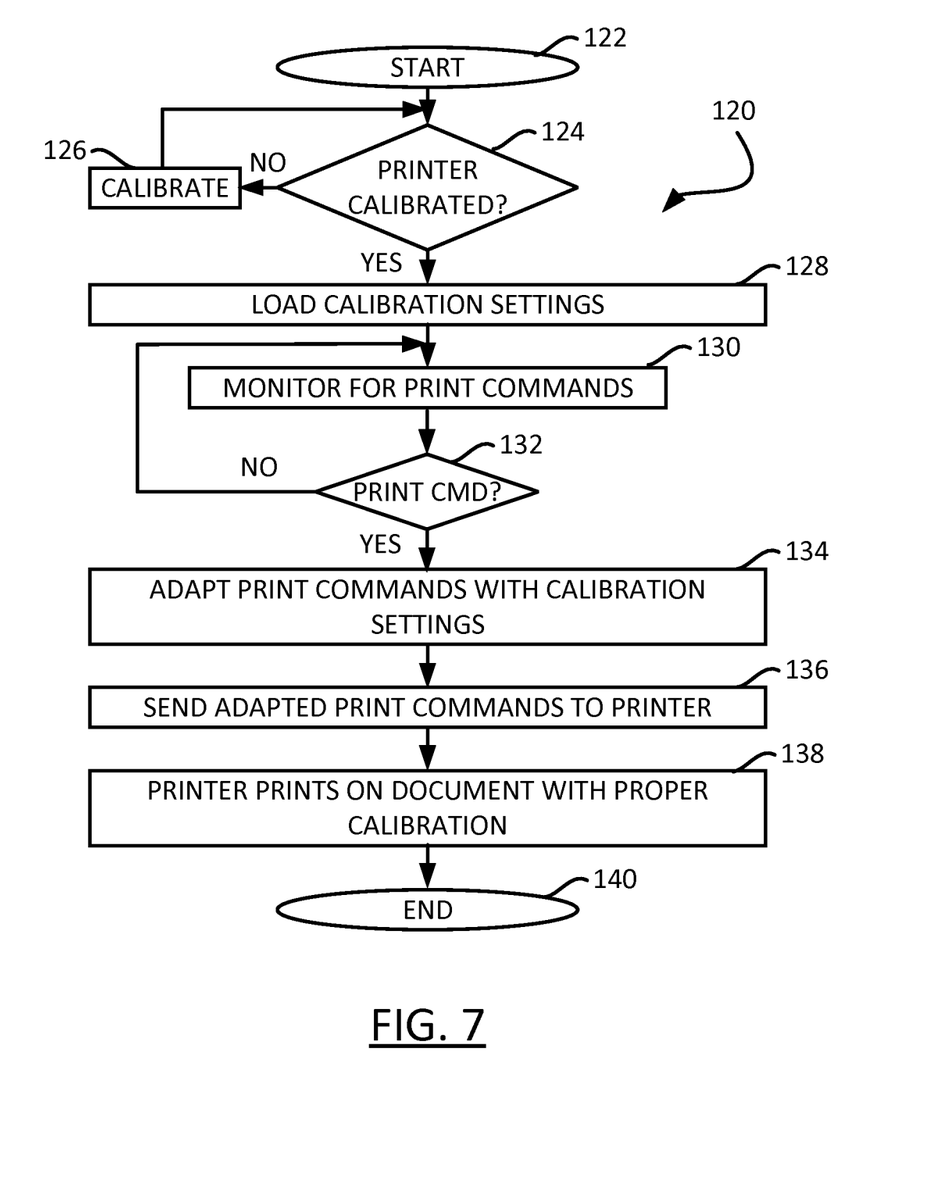
FIG. 7 is a flow chart illustrating a method to perform a calibrated print on a document, according to an embodiment of the present invention.

Referring now to flowchart 120 of FIG. 7, an illustrative operation will now be described calibrating a printer and saving calibration settings. Staring at Block 122, the system may determine whether the printer has been calibrated (Block 124). If the printer has not been calibrated, the system may calibrate the printer at Block 126, after which it may again determine whether the printer has been properly calibrated at Block 124. The steps involved with calibration will discussed in greater detail below.

If it is determined at Block 124 that the printer has been properly calibrated, the operation may load the calibration settings into the printer (Block 128). As discussed above, the calibration settings may be stored in memory of the system, within the printer, and/or on a database accessible via a network. Once the calibration settings have been loaded, the system may monitor for a print command (Block 130). A print command may be received by the system, a user, or another source. If the system determines that no print command has been received at Block 132, it may continue to monitor for a print command (Block 130). If a print command has been detected at Block 132, the system may adapt the print command to be consistent with the calibration settings (Block 134). As an example, this adaptation may include offsetting the print coordinates of an ink droplet, toner particle, or printed pixel or space. Once the print command has been detected and adapted, the system may send the adapted print command to the printer (Block 136). The printer may then print to a document with proper calibration settings (Block 138). The operation may then terminate at Block 140.

Figure 8:
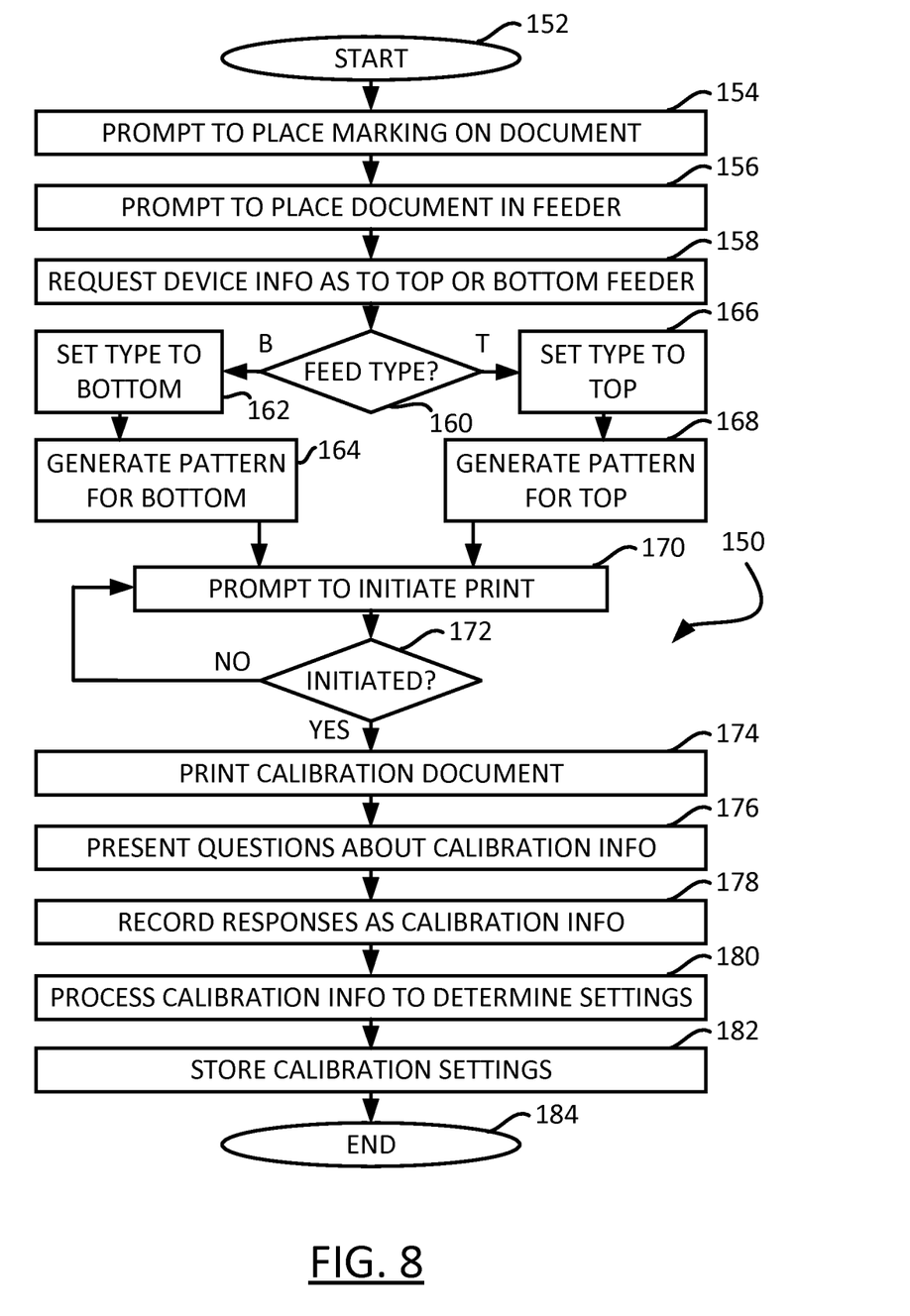
FIG. 8 is a flow chart illustrating a method to calibrate a printer, according to an embodiment of the present invention.

Referring now to flowchart 150 of FIG. 8, an illustrative operation for calibrating a printer will now be discussed. Starting at Block 152, the system may prompt a user to place a marking at a location on the document (Block 154). As an example, without limitation, a user may be prompted to place an "X" in the top left corner of the document at Block 154. The system may then prompt the user to place the document with the marking in the paper feeder (Block 156). The system may also request the user to input device information at Block 158. Device information may include, for example, information about the printer or other device, such as whether the printer uses a top or bottom document feeder.

If it is indicated at Block 160 that a bottom feeding mechanism is used by the printer, the system may be set to proceed with calibration settings and prompts consistent with a bottom fed printer (Block 162). The system may then generate a calibration pattern consistent with a bottom fed printer (Block 164). Alternatively, if it is indicated at Block 160 that a top feeding mechanism is used by the printer, the system may be set to proceed with calibration settings and prompts consistent with a top fed printer (Block 166). The system may then generate a calibration pattern consistent with a top fed printer (Block 168).

Once the calibration pattern has been generated at Block 164 and/or 168, the system may prompt a user to initiate a printing operation (Block 170). Skilled artisans will appreciate that the system may also monitor for a print command from the system, a user, or another source at Block 170 to initiate the printing operation. If it is determined that no printing operation has been initiated at Block 172, the system will continue to monitor for an initiation of the printing operation (Block 170). Conversely, if it is determined that a printing operation has been initiated at Block 172, the system may print the calibration pattern document, creating a calibration document (Block 174). Examples of calibration documents have been illustrated in FIGS. 2-5.

After printing the calibration document, the system may then present questions to the user to collect calibration information about the calibration patterns included on the calibration document (Block 176). The questions about the calibration pattern may include indicating the location of a marking with respect to one or more calibration space. The system may record the response to the questions as calibration information, for example, to memory (Block 178). The system may then process the calibration information provided as responses to the questions, generating calibration settings for the printer (Block 180). The calibration settings may then be stored to memory at Block 182. The operation may then terminate at Block 184.

Figure 9:
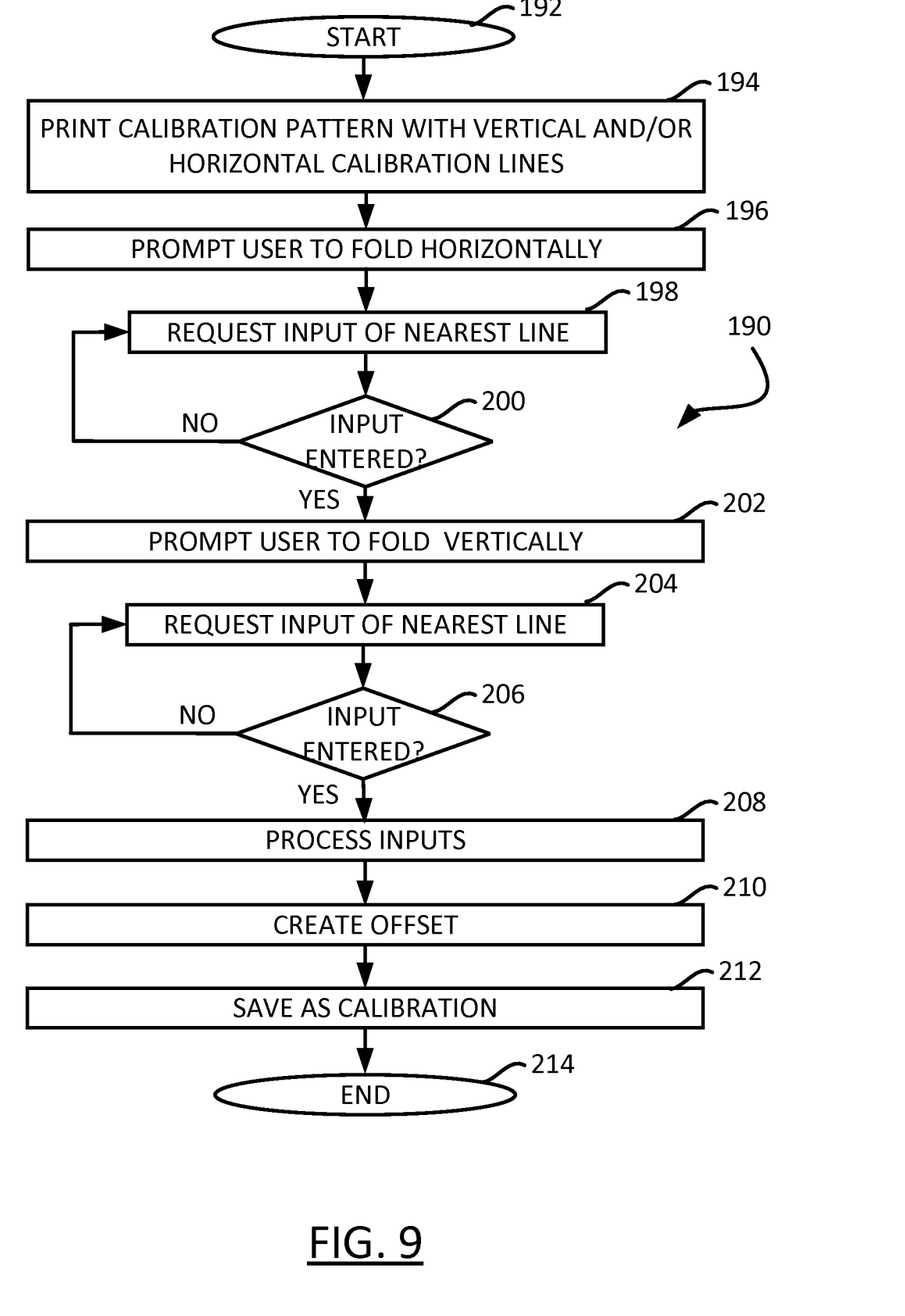
FIG. 9 is a flow chart illustrating a method to calibrate a printer, according to an embodiment of the present invention.

Referring now to flowchart 190 of FIG. 9, an additional calibration operation will now be discussed. Skilled artisans will appreciate that the calibration operations of FIGS. 8 and 9 may be performed separately, together, or along with another calibration operation that would be apparent to a skilled artisan after having the benefit of this disclosure.

Starting at Block 192, the system may print a calibration pattern with vertical and/or horizontal calibration lines to a calibration document (Block 194). After the calibration document has been printed, the system may prompt the user to fold the calibration document side to side, or such that the opposing edges of the document with the longer length touch (Block 196). The folding may include creating a crease along the approximate center of the fold. The system may then request the user input calibration information relating to the vertical calibration line of the calibration pattern nearest to the crease (Block 198). If no calibration information is input at Block 200, the system may continue to monitor for the input (Block 198). Conversely, if calibration information is input at Block 200, the system may proceed to the operation of Block 202.

Continuing the calibration operation, the system may prompt the user to fold the calibration document from top to bottom, or such that the opposing edges of the document with the shorter length touch (Block 202). The folding may include creating a crease along the approximate center of the fold. The system may then request the user to input calibration information relating to the horizontal calibration line of the calibration pattern nearest to the crease (Block 204). If no calibration information is input at Block 206, the system may continue to monitor for the input (Block 204). Conversely, if calibration information is input at Block 206, the system may proceed to the operation of Block 208, wherein it may process the inputted calibration information.

Once the calibration information has been processed at Block 208, the system may create an offset (Block 210). The offset may be used to ensure a printing is properly calibrated, for example, centrally located on a document. The calibration settings may then be saved at Block 212. As discussed above, the calibration settings may be saved to memory, a database accessible via a network, or at another location. The operation may then terminate at Block 214.

In an embodiment of the present invention, the database may include configuration settings for a plurality of printers. The configuration setting may be downloadable for a printer from the database without the requirement of one or more of the steps disclosed above. The use of settings stored on a database may be used to calibrate a printer previously calibrated by the same user, or optionally a printer calibrated by one or more other users. Data relating to calibration may be aggregated on the database. This data may be processed by a system connected to the database to determine default calibration settings for one or more printer makes and models.

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A system to calibrate a printer comprising:
a controller comprising a processor and memory to control printing a document relative to characteristics of the document using the printer, calibration settings for the printer being manipulable;
a calibration module accessible using an interface to calibrate the printer by:
prompting a user to place a marking on a calibration document,
acquiring device information about the printer comprising orientation of a feeder,
analyzing the device information and document characteristics to determine a calibration pattern,
printing the calibration pattern to the calibration document,
acquiring calibration information about the printed calibration pattern comprising locating the marking relative to the calibration pattern,
analyzing the calibration information to determine the calibration settings, and
storing the calibration settings to the memory;
wherein calibration comprises determining a center point of the document
wherein the calibration information is at least partially determinable from locating the marking;
wherein the calibration settings are at least partially determinable by locating the marking.

2. The system of claim 1, wherein the calibration module is additionally used to calibrate the controller by:
prompting the user to fold the calibration document creating at least a partial crease;
acquiring calibration information about the calibration pattern relative to the crease; and analyzing the calibration information to further determine the calibration settings.

3. The system of claim 2, wherein the fold comprises a vertical fold and a horizontal fold.

4. The system of claim 1, further comprising a network adapter to connect the system to a network, wherein a database is accessible over the network, and wherein the calibration settings are storable on the database.

5. The system of claim 4, wherein the configuration settings are downloadable from the database over the network.

6. The system of claim 5, wherein the printer is associable with a plurality of controllers, and wherein the configuration settings for the printer are downloadable to each of the plurality of controllers from the database.

7. The system of claim 4, wherein the interface is accessible over the network.

8. The system of claim 7, wherein the interface comprises pages to at least provide instructions, prompt the user to perform an action, or acquire the information.

9. The system of claim 1, wherein the calibration information is determined by analyzing an interaction from the user.

10. A method of calibrating a printer using a controller with a processor and memory with a manipulable interface comprising:
   (a) prompting a user to place a marking on a calibration document;
   (b) acquiring device information about the printer comprising orientation of a feeder;
   (c) analyzing the device information and document characteristics to determine a calibration pattern;
   (d) printing the calibration pattern to the calibration document;
   (e) acquiring calibration information about the printed calibration pattern comprising locating the marking relative to the calibration pattern;
   (f) analyzing the calibration information to determine calibration settings for the printer; and
   (g) storing the calibration settings to the memory;
   wherein calibrating the printer comprises determining a center point of the document;
   wherein the calibration settings are at least partially determinable by locating the marking.

11. The method of claim 10, further comprising the steps of:
   (h) prompting the user to fold the calibration document creating at least a partial crease;
   (i) acquiring details about the calibration pattern relative to the crease; and
   (j) analyzing the details to further determine calibration settings for the printer.

12. The method of claim 11, wherein the fold comprises a vertical fold and a horizontal fold.

13. The method of claim 10, wherein the system comprises a network adapter to connect the system to a network, the method further comprising the steps of:
   (k) accessing a database over the network, and
   (l) storing or retrieving calibration settings locatable on the database.

14. The method of claim 13, wherein the printer is associable with a plurality of controllers, and wherein the configuration settings for the printer are downloadable to each of the plurality of controllers from the database.

15. The method of claim 14, further comprising accessing the interface over the network.

16. The method of claim 15, wherein the interface comprises pages to at least provide instructions, prompt the user to perform an action, or acquire information.

17. A method of calibrating a printer using a controller with a processor, memory, and network adapter, the controller comprising a manipulable interface and being connectable to a database over the network, the method comprising:
   (a) prompting a user to place a marking on a calibration document using an interface accessible over a network;
   (b) acquiring device information about the printer comprising orientation of a feeder;
   (c) analyzing the device information and document characteristics to determine a calibration pattern;
   (d) printing the calibration pattern to the calibration document;
   (e) acquiring calibration information;
   (f) prompting the user to fold the calibration document;
   (g) acquiring calibration information from analyzing the printed calibration pattern, the analysis comprising locating the marking relative to the calibration pattern, and from analyzing the calibration pattern relative to an at least partial crease created by folding the calibration document;
   (h) processing the calibration information to determine calibration settings for the printer;
   (i) accessing a database using the network; and
   (j) storing or retrieving calibration settings locatable on the database;
   wherein calibrating the printer comprises determining a center point of the document;
   wherein the calibration settings are at least partially determinable by locating the marking.

18. The method of claim 17, wherein the fold comprises a vertical fold and a horizontal fold.

19. The method of claim 17, further comprising storing the calibration settings to the memory.

20. The method of claim 17, wherein the printer is associable with a plurality of computing devices, and wherein the configuration settings for the printer are downloadable to each of the plurality of computing devices from the database.

21. The method of claim 17, wherein the interface comprises pages to at least provide instructions, prompt the user to perform an action, or receive inputs.

* * * * *